(12) United States Patent
Ogawa

(10) Patent No.: US 8,253,794 B2
(45) Date of Patent: Aug. 28, 2012

(54) IMAGE PROCESSING APPARATUS AND IMAGE DISPLAY METHOD

(75) Inventor: Kaname Ogawa, Kanagawa (JP)

(73) Assignee: Sony Corporation (JP)

( * ) Notice: Subject to any disclaimer, the term of this patent is extended or adjusted under 35 U.S.C. 154(b) by 1324 days.

(21) Appl. No.: 11/729,946

(22) Filed: Mar. 28, 2007

(65) Prior Publication Data
US 2008/0144890 A1  Jun. 19, 2008

(30) Foreign Application Priority Data

Apr. 4, 2006  (JP) ................. P2006-103125

(51) Int. Cl.
 *H04N 7/18* (2006.01)
 *G06K 9/00* (2006.01)
(52) U.S. Cl. .............. 348/135; 382/118; 345/156
(58) Field of Classification Search .......... 382/190, 382/118, 103, 305; 345/419, 719, 156; 348/135
See application file for complete search history.

(56) References Cited

U.S. PATENT DOCUMENTS

| | | | |
|---|---|---|---|
| 6,728,473 B1 | 4/2004 | Chotoku et al. | |
| 2003/0052910 A1* | 3/2003 | Shiiyama | 345/719 |
| 2004/0027369 A1 | 2/2004 | Kellock et al. | |
| 2006/0012596 A1* | 1/2006 | Fukuya | 345/419 |
| 2006/0093185 A1* | 5/2006 | Kato et al. | 382/103 |
| 2006/0115157 A1* | 6/2006 | Mori et al. | 382/190 |
| 2006/0115185 A1* | 6/2006 | Iida et al. | 382/305 |
| 2006/0126906 A1* | 6/2006 | Sato et al. | 382/118 |
| 2006/0126941 A1* | 6/2006 | Higaki | 382/190 |
| 2006/0193502 A1* | 8/2006 | Yamaguchi | 382/118 |

FOREIGN PATENT DOCUMENTS

| | | |
|---|---|---|
| JP | 2000-350124 A | 12/2000 |
| JP | 2005-506643 A | 3/2005 |

* cited by examiner

*Primary Examiner* — Jungwon Chang
(74) *Attorney, Agent, or Firm* — Lerner, David, Littenberg, Krumholz & Mentlik, LLP

(57) ABSTRACT

An image processing apparatus may include an input accepting unit configured to accept an operation input about an input image; a time-series section generating unit configured to accept information specifying a time-series section where frames including a face of a specified person appear in the input image and information specifying a representative frame of the time-series section and to draw display of the time-series section and the representative frame on the basis of the information; and an image control unit configured to allow the time-series section generating unit to draw display of the time-series section in accordance with the operation input.

11 Claims, 15 Drawing Sheets

FIG. 2

| FACE LABEL 410 | START TIME 420 | END TIME 430 | REPRESENTATIVE FRAME 440 |
|---|---|---|---|
| A001 | 0 | 300 | •→ |
| B001 | 100 | 400 | •→ |
| C001 | 250 | 350 | •→ |
| D001 | 380 | 500 | •→ |

400

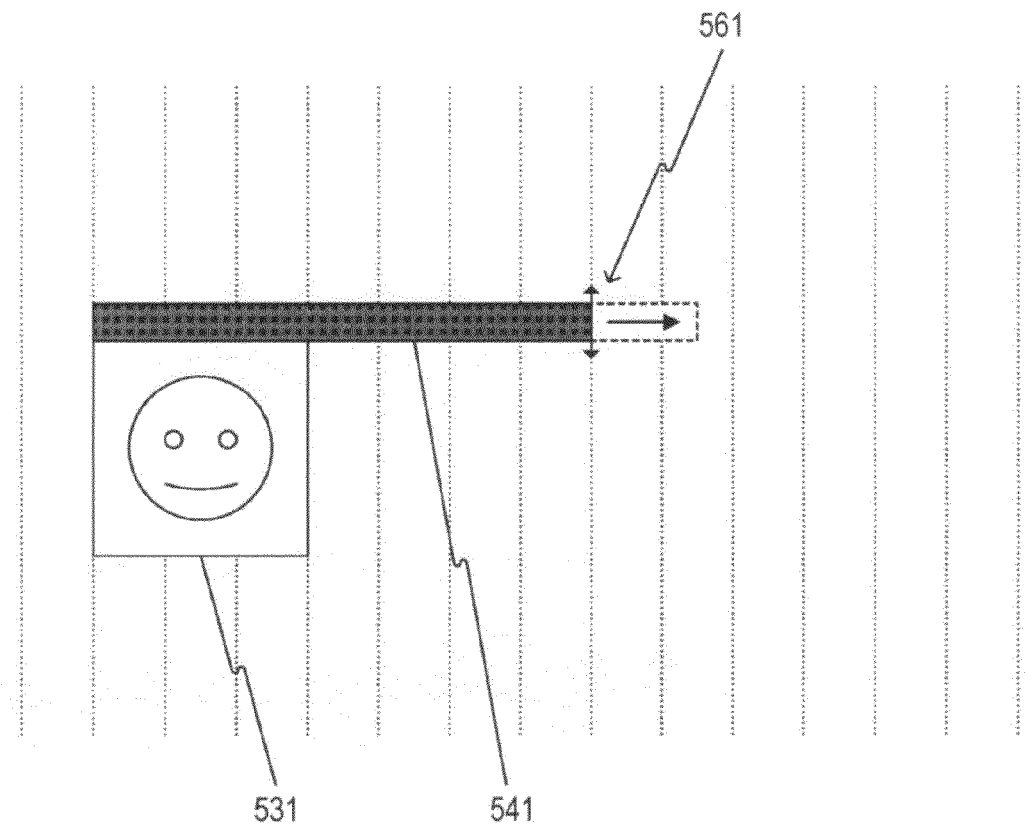

IMAGE PROCESSING APPARATUS AND IMAGE DISPLAY METHOD

CROSS-REFERENCE TO RELATED APPLICATIONS

This application claims priority from Japanese Patent Application No. JP 2006-103125 filed in the Japanese Patent Office on Apr. 4, 2006, the entire content of which is incorporated herein by reference.

BACKGROUND OF THE INVENTION

1. Field of the Invention

The present invention relates to an image processing apparatus, particularly to an image processing apparatus dealing with an image including a face of a specified person, a processing method therefor, and a program allowing a computer to execute the method.

2. Description of the Related Art

Conventionally, when a user wants to reproduce or edit time-series frames of a moving image, the user browses through all of the frames and selects a desired scene. This is a directional method, but is not necessarily efficient because the skill of grasping respective scenes differs in individuals.

On the other hand, there has been suggested a moving image recording and reproducing apparatus that detects a face from a moving image and adopts a frame in which an evaluation value of the detected face is maximum as a representative frame so that a user can grasp the content of the moving image (e.g., see Patent Document 1: Japanese Unexamined Patent Application Publication No. 2000-350124 (FIG. 1)).

SUMMARY OF THE INVENTION

In the above-described known art, a maximum of an evaluation value is calculated at predetermined time intervals, whereby a representative frame in each section is selected. In this method, however, the time intervals are fixed and the selected representative frame may be different from that desired by the user. Furthermore, in order to strictly determine representative frames, the time intervals of calculating a maximum of the evaluation value needs to be short. As a result, the number of representative frames becomes enormous, which causes inconvenience.

Accordingly, the present invention is directed to displaying a list of detected faces of people so that a user can see all time-series frames.

An image processing apparatus according to an embodiment of the present invention may include input accepting means for accepting an operation input about an input image; time-series section generating means for accepting information specifying a time-series section where frames including a face of a specified person appear in the input image and information specifying a representative frame of the time-series section and for drawing display of the time-series section and the representative frame on the basis of the information; and image control means for allowing the time-series section generating means to draw display of the time-series section in accordance with the operation input. With this configuration, a face of a person appearing in an image may be displayed in accordance with transition of time.

The time-series section generating means may further accept information identifying the face of the person and draw the information together with display of the time-series section. Accordingly, the face of the person appearing in an image may be identified.

If the input image includes faces of a plurality of people, the time-series section generating means may draw display of the time-series section for each of the faces of the plurality of people. Accordingly, transition of time when each person appears in the image can be displayed.

If a reproducing process of the time-series section is selected in the operation input, the image control means may reproduce the input image corresponding to the selected time-series section. Accordingly, the image can be reproduced by referring to the face of a person.

If a new creating process of the time-series section is selected in the operation input, the image control means may create a new image on the basis of the input image corresponding to the selected time-series section. Accordingly, a new image can be created by combining frames selected by referring to the face of a person.

An image processing apparatus according to another embodiment of the present invention may include input accepting means for accepting an operation input about an input image; time-series section generating means for accepting information specifying a time-series section where frames including a face of a specified person appear in the input image and information specifying a representative frame of the time-series section and for drawing display of the time-series section and the representative frame on the basis of the information; and image control means for allowing the time-series section generating means to draw display of the time-series section in accordance with the operation input. With this configuration, the face of a person appearing in the image may be displayed along the time axis in accordance with transition of time.

If the input image includes faces of a plurality of people, the time-series section generating means may draw display of the time-series section of each of the people so that the faces of the plurality of people are placed in a direction vertical to the time axis direction.

According to another embodiment of the present invention, there is provided an image display method which may include the following steps or a program allowing a computer to execute the following steps. The steps may include accepting information specifying a time-series section where frames including a face of a specified person appear in an input image and information specifying a representative frame of the time-series section; drawing the time-series section in a corresponding position on a time axis of the input image on the basis of the information specifying the time-series section; and obtaining the representative frame on the basis of the information specifying the representative frame and drawing the representative frame together with the time-series section. Accordingly, the face of a person appearing in the image can be displayed in accordance with transition of time.

According to an embodiment of the present invention, an excellent effect of displaying a list of faces of people detected from time-series frames may be obtained.

BRIEF DESCRIPTION OF THE DRAWINGS

FIG. 2 shows an example of a configuration of a face information table 400 according to the embodiment of the present invention;

FIG. 7 shows an example of a process of adjusting a time-series section performed by the image processing apparatus according to the embodiment of the present invention;

DETAILED DESCRIPTION

Hereinafter, an embodiment of the present invention is described in detail with reference to the drawings.

Figure 1:
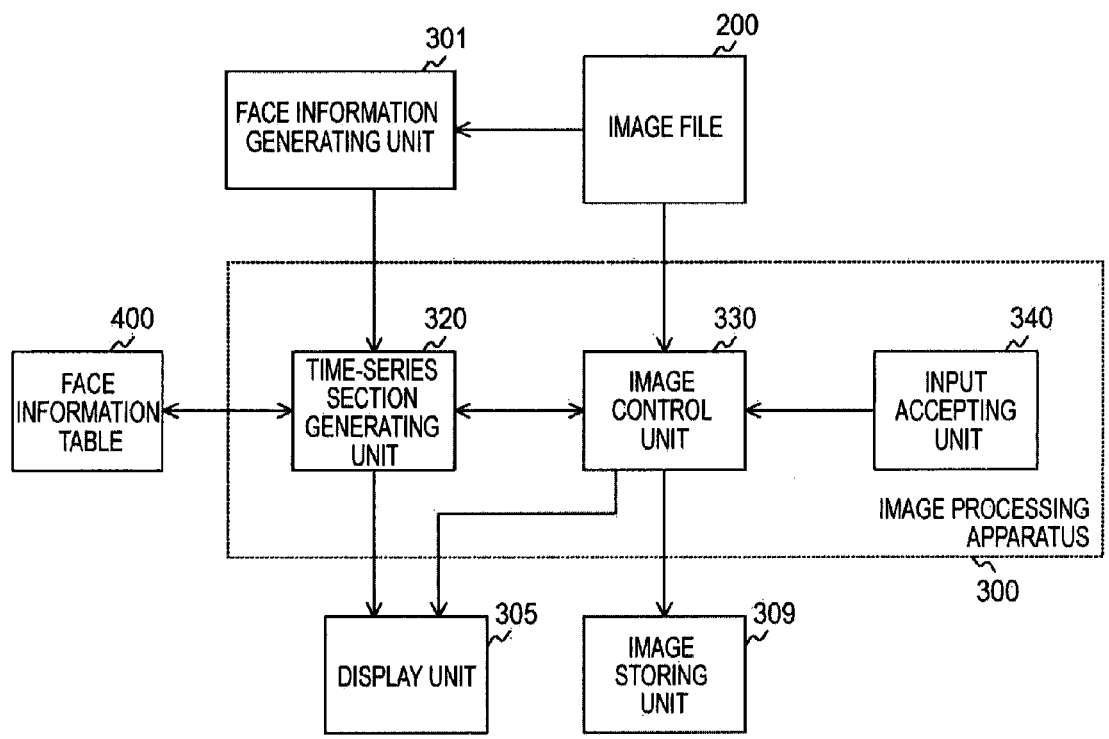
FIG. 1 shows an example of a configuration of an image processing apparatus 300 according to an embodiment of the present invention.

FIG. 1 shows an example of a configuration of an image processing apparatus 300 according to the embodiment of the present invention. The image processing apparatus 300 obtains time-series frames of an image from an image file 200 and allows a display unit 305 to display the image or allows an image storing unit 309 to store the image. Also, the image processing apparatus 300 displays a time-series section where frames including a face of a specified person appear in the image file 200, on the basis of face information generated by a face information generating unit 301.

The image file 200 is a file to hold time-series frames of an image, mainly a moving image. However, a still image captured together with the moving image may also be held therein. In this example, it is assumed that an image input to the image processing apparatus 300 is an image supplied from the image file 200. Alternatively, an image captured by an imaging apparatus may also be used in real time. Also, an image received by a broadcast receiving apparatus may be used. That is, an image once accumulated in a file may be used as an input image. Also, an image stream may be used as an input image.

The face information generating unit 301 detects a face of a specified person in an input image supplied from the image file 200 and generates face information, which specifies a time-series section where frames including the face appear.

The face information generating unit 301 considers the similarity and temporal continuity among faces detected from respective frames of the input image, and groups the faces of the respective frames. Among the frames belonging to the group, a frame of the earliest time corresponds to a temporal start position of this section, and a frame of the latest time corresponds to a temporal end position of this section. An area between the start and end positions corresponds to a time-series section including the person. As a unit of the time-series section, time or a frame number is used, for example. When an MPEG (Moving Picture Experts Group) method is adopted as an encoding method, a GOP (group of pictures) number can be used as a unit of the time-series section.

Also, the face information generating unit 301 supplies information specifying a representative frame (e.g., a thumbnail) in the time-series section where the face of the specified person is detected. The face information generating unit 301 may set a face frame of the earliest time among the face frames in the group as a representative frame of the section. Alternatively, a face frame having the largest evaluation value in the group may be set as a representative frame. The information specifying the representative frame may be a still image obtained from the image file 200 or may be an address indicating a position in the image file 200.

Furthermore, the face information generating unit 301 supplies information for identifying faces detected in an input image, the information including face labels. The face labels may be identifiers as internal codes, or names or the like may be held in the form of character strings.

The display unit 305 displays a time-series section where frames including a face of a specified person appear and the content thereof in the image file 200, and is realized by an LCD (liquid crystal display) or the like.

The image storing unit 309 stores an image edited by the image processing apparatus 300. For example, an external recording medium such as a flash memory can be used.

The image processing apparatus 300 includes a time-series section generating unit 320, an image control unit 330, and an input accepting unit 340. The time-series section generating unit 320 receives face information from the face information generating unit 301 and draws a time-series section where frames including a face of a specified person appear. Also, the time-series section generating unit 320 draws a representative frame in the time-series section. The input accepting unit 340 accepts an operation input about an input image from a user, and is realized by a mouse or a touch panel. The image control unit 330 allows the time-series section generating unit 320 to draw the time-series section in accordance with the operation input. Also, the image control unit 330 obtains an image from the image file 200 in accordance with an operation input and allows the display unit 305 to display the image or allows the image storing unit 309 to store the image.

The time-series section generating unit 320 can allow a face information table 400 to hold face information received from the face information generating unit 301. The face information held in the face information table 400 can be changed by an operation input accepted by the input accepting unit 340.

FIG. 2 shows an example of a configuration of the face information table 400 according to the embodiment of the present invention. The face information table 400 includes the following items: face label 410; start time 420; end time 430; and representative frame 440. The face label 410 is for identifying faces of people included in an input image. As described above, respective face labels may be identifiers as internal codes, or names can be held in the form of character strings.

The start time 420 is time when a face identified by the face label 410 starts to appear. The end time 430 is time when a face identified by the face label 410 ends to appear. The start time 420 and the end time 430 may be relative time to the top of the input image, or may be actual absolute time. When relative time is adopted, the time may be represented by a frame number or a GOP number. In this case, a frame number is used as a unit of time.

The representative frame 440 specifies a representative frame of a face identified by the face label 410, and may be a representative frame itself or an address indicating a position in the image file 200.

Figure 3:
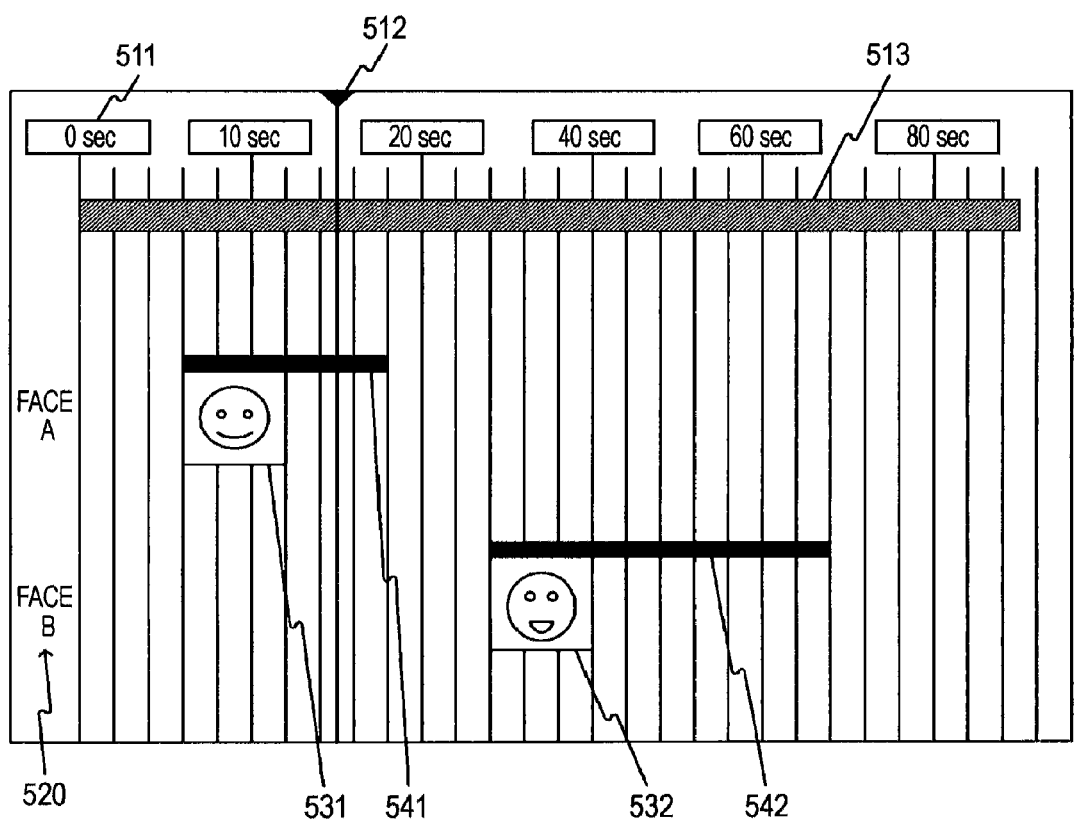
FIG. 3 shows a display example in the image processing apparatus according to the embodiment of the present invention.

FIG. 3 shows a display example in the image processing apparatus according to the embodiment of the present invention. In this display example, a time axis is horizontally set so that time proceeds from left to right. Under the time axis, time-series sections of respective people are placed in the vertical direction.

Time labels 511 indicating respective times are displayed in the time-axis direction. A bar 513 indicating the entire length of an input image is displayed thereunder. The input image may be, for example, a moving image of one chapter. When an input image is being reproduced, a current reproduced position 512 is shown at a corresponding position on the time axis.

Under the bar 513, time-series section bars 541 and 542 corresponding to face labels 520 of respective people (two people) are shown. Corresponding representative frames 531 and 532 are displayed near the time-series section bars 541 and 542, respectively. Each of the representative frames 531 and 532 shows a face of the person. By referring to the time-series section bars 541 and 542 corresponding thereto, a user can grasp the sections where the respective people appear at first sight.

Figure 4:
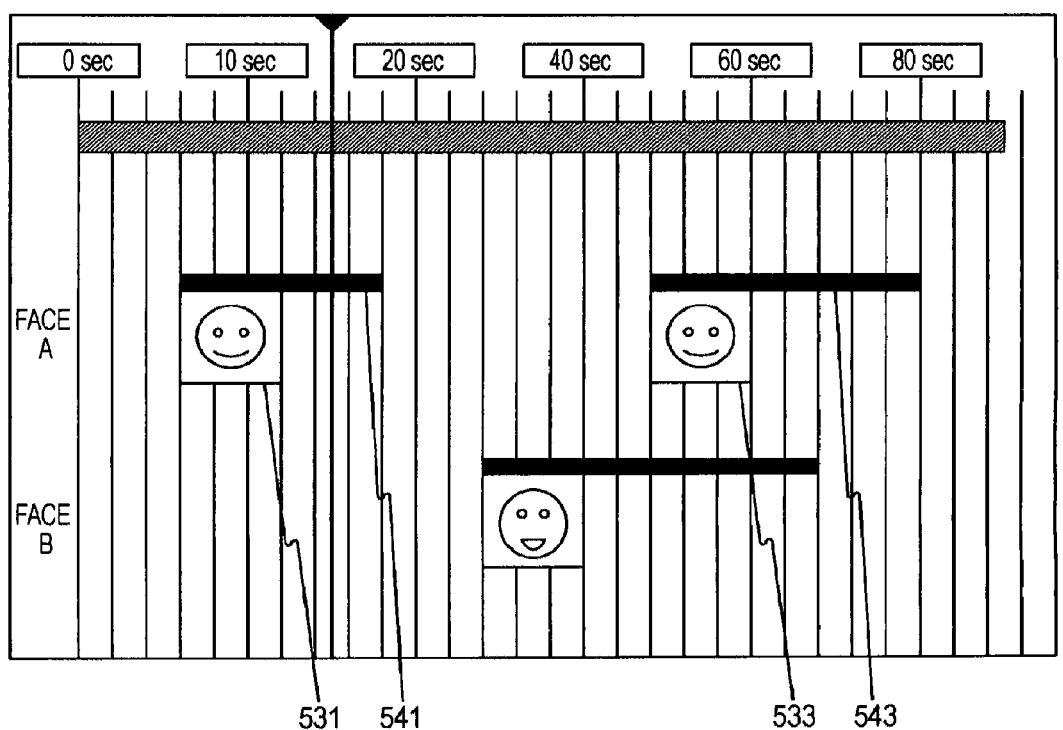
FIG. 4 shows another display example in the image processing apparatus according to the embodiment of the present invention.

FIG. 4 shows another display example in the image processing apparatus according to the embodiment of the present invention. In this display example, if the same person appears a plurality of times, the time-series sections bars thereof are displayed in the same level in the vertical direction.

In this example, a time-series section bar 543 and a representative frame 533 are displayed on the right side of the time-series section bar 541 and the representative frame 531 about face A. That is, the time-series section bar 543 and the representative frame 533 are displayed at the same level in the vertical direction as that of the time-series section bar 541 and the representative frame 531. Accordingly, the user can grasp at first sight that face A appears a plurality of times.

Figure 5:
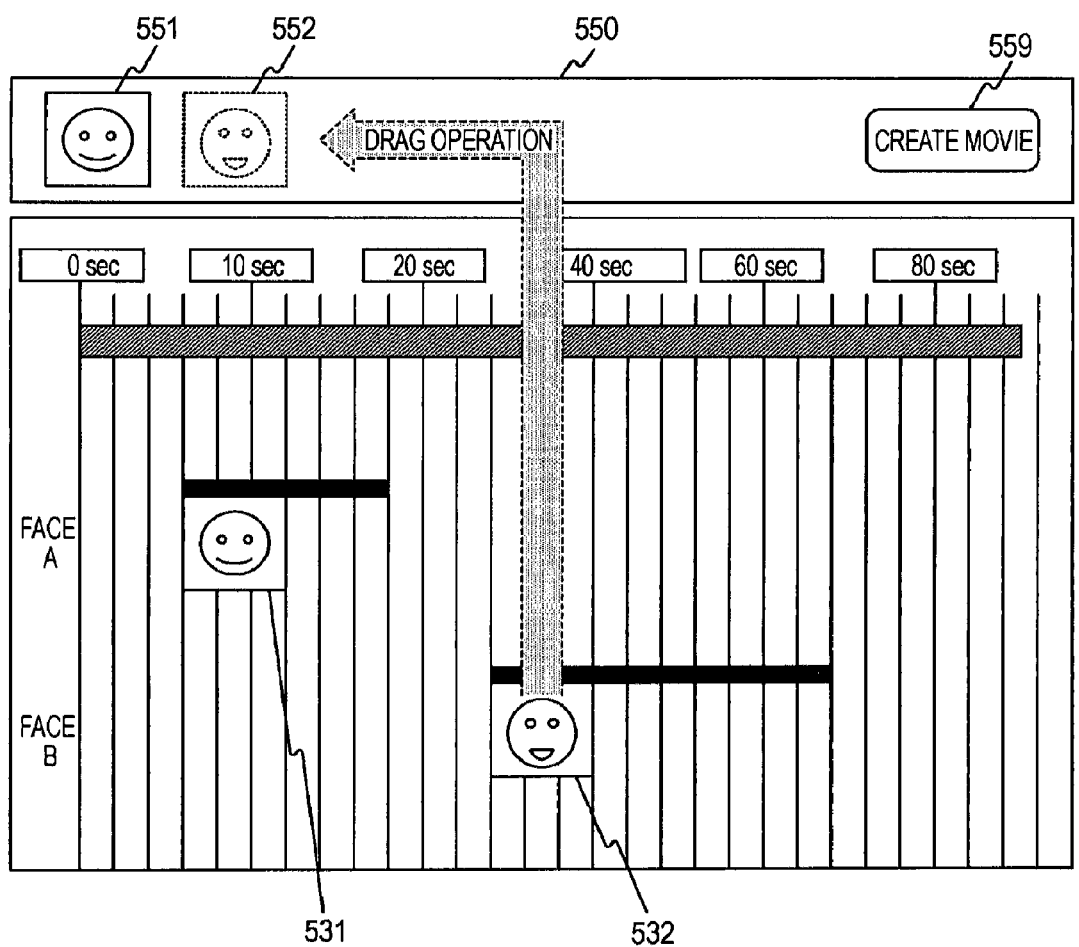
FIG. 5 shows a display example of an editing process performed by the image processing apparatus according to the embodiment of the present invention.

FIG. 5 shows a display example of an editing process in the image processing apparatus according to the embodiment of the present invention. In this example, an edit input area 550 is provided at an upper part. If a representative frame is put into the edit input area 550 by a drag operation, frames in the corresponding time-series section are registered to be edited. In this example, the representative frame 531 is already registered as an object to be edited 551, and the representative frame 532 is about to be registered as an object to be edited 552.

After the registration, if a movie creation button 559 is pressed, the frames to be edited are combined and a new image is created as a result. In this example, frames in the time-series section corresponding to the representative frame 531 and frames in the time-series section corresponding to the representative frame 532 are combined into a new image, which is stored in the image storing unit 309.

The movie creation button 559 may be displayed only while an external recording medium such as a flash memory is connected.

Figure 6A:
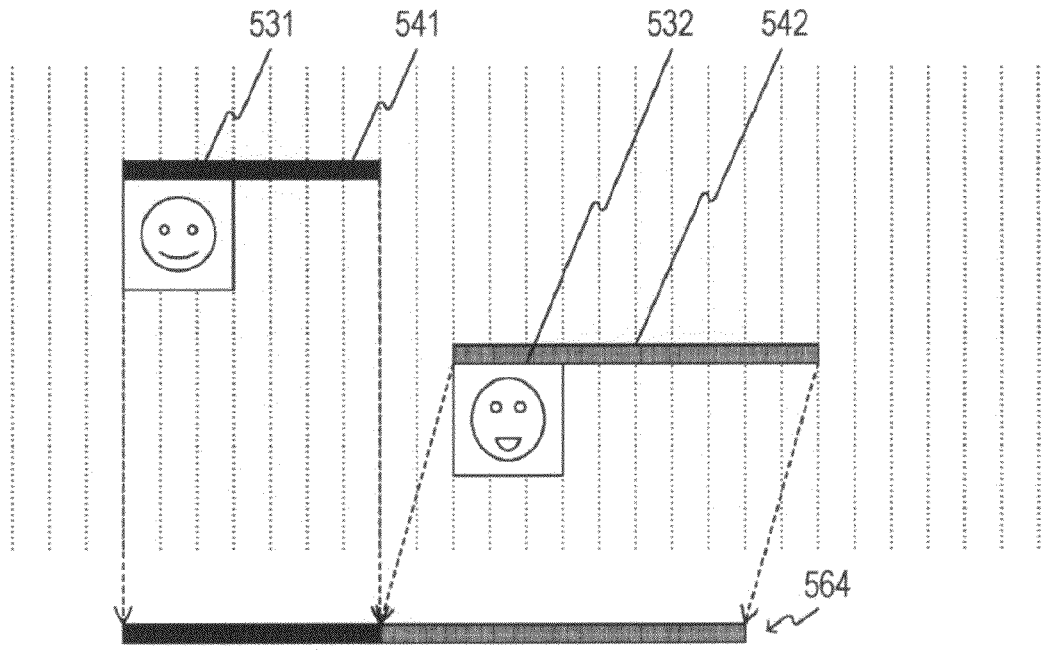
FIGS. 6A and 6B show examples of the editing process performed by the image processing apparatus according to the embodiment of the present invention.
Figure 6B:
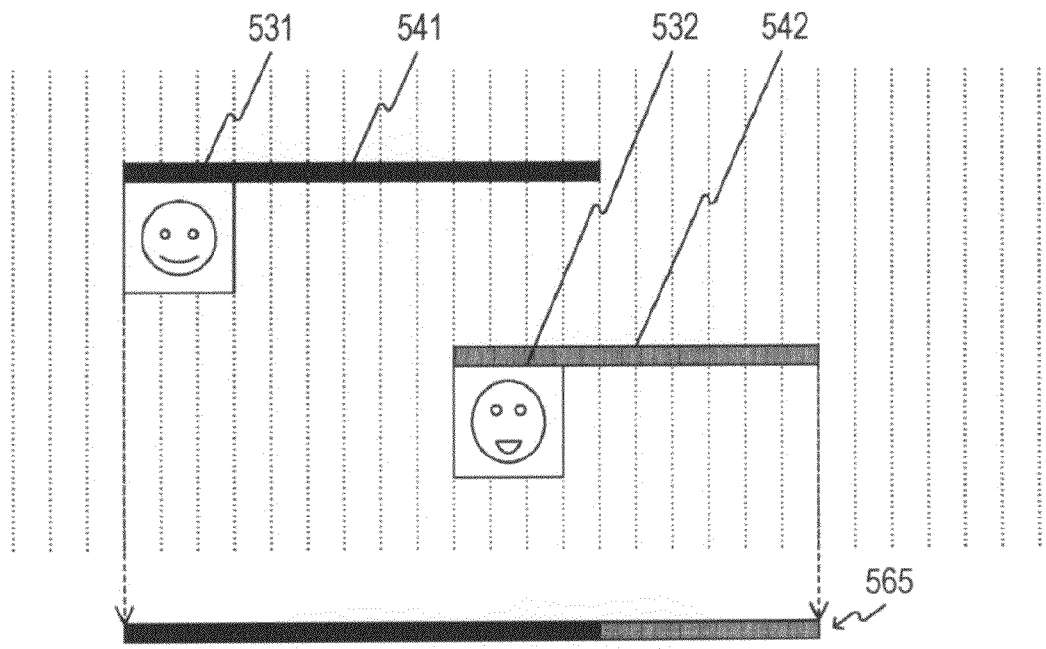

FIGS. 6A and 6B show examples of an editing process performed in the image processing apparatus according to the embodiment of the present invention. FIG. 6A shows an example in which time-series sections registered as objects to be edited do not overlap with each other. In this case, the time-series section bars 541 and 542 are connected, so that a new image 564 is created. In the image 564, frames in the time-series section bar 541 are displayed in time series, and then frames in the time-series section bar 542 are displayed. However, the display order of the frames can be arbitrarily specified. For example, the frames may be displayed in the order of being put into the edit input area 550.

FIG. 6B shows a case where the time-series sections registered to be edited overlap with each other. In this case, the overlapped portion is not displayed as overlapped frames, but a new image 565 is created on the basis of sum of sets on the time axis of the time-series section bars 541 and 542. In this case, frames are displayed from the top of the image 565 if the order is based on time-series. On the other hand, if the frames are to be displayed in the order of being put into the edit input area 550, for example, if frames corresponding to the time-series section bar 542 are put into the edit input area 550 and then frames corresponding to the time-series section bar 541 are put into the edit input area 550, the frames corresponding to the time-series section bar 542 are displayed first, and then frames that have not been displayed among the frames corresponding to the time-series section bar 541 are displayed.

FIG. 7 shows an example of a process of adjusting a time-series section performed in the image processing apparatus according to the embodiment of the present invention. When a time-series section is displayed on the time axis, a user can change the time length thereof.

For example, if the user wants to change the end position of the time-series section bar 541 corresponding to the representative frame 531, the user moves a cursor to the right end of the time-series section bar 541, so that the cursor changes to a changing pointer 561 and that a change input can be accepted. When the input accepting unit 340 accepts a change input through a mouse or the like, the end position of the time-series section bar 541 is re-drawn in accordance with the input, and the end time 430 in the face information table 400 is reset.

The start time of the time-series section bar 541 can also be changed in the same operation. Accordingly, the image can be edited by a simple operation.

Figure 8:
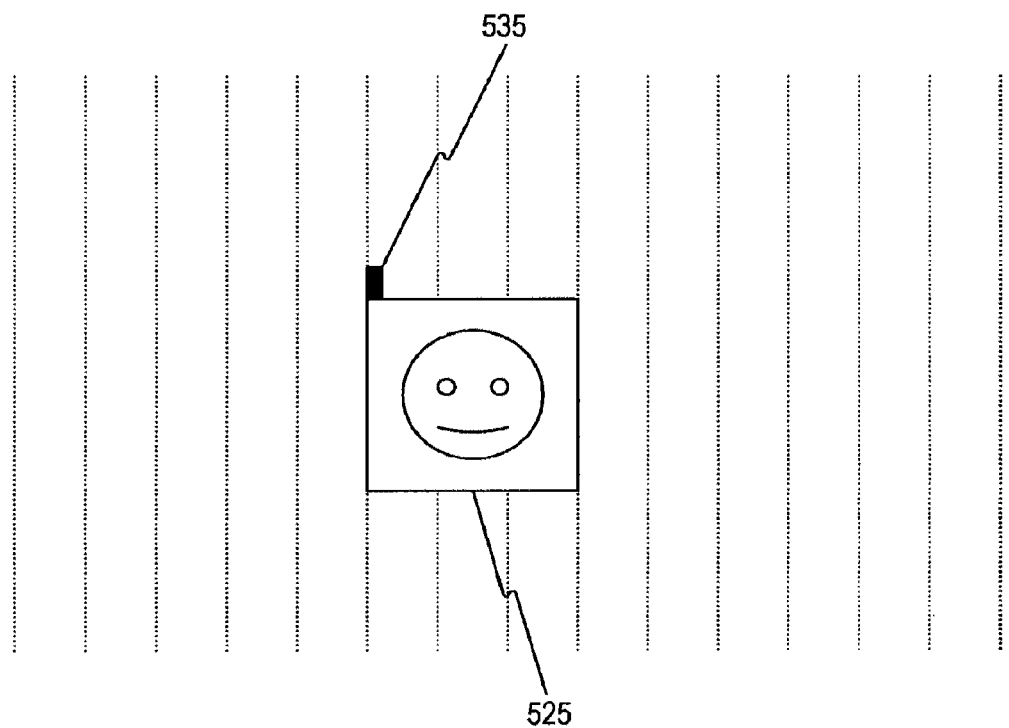
FIG. 8 shows a display example of a still image performed by the image processing apparatus according to the embodiment of the present invention.

FIG. 8 shows a display example of a still image in the image processing apparatus according to the embodiment of the present invention. The above-described display examples are based on the assumption that an image extracted by the face information generating unit 301 is a moving image. However, the present invention is not limited to the moving image. For example, assuming that a still image is captured in parallel with a moving image by an imaging apparatus, the still image can be regarded as an image whose start time and end time match with each other.

In this embodiment of the present invention, a time-series section bar 545 of a still image is displayed by the same interface as that for a moving image, as shown in FIG. 8. Accordingly, moving and still images can be displayed together.

FIGS. 9A to 9D show appearances of imaging apparatuses 100a and 100b, which are examples of the image processing apparatus according to the embodiment of the present invention. The imaging apparatus 100a mainly captures still images, whereas the imaging apparatus 100b mainly captures moving images.

Figure 9A:
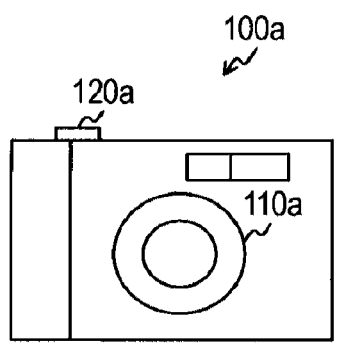
FIGS. 9A, 9B, 9C, and 9D show appearances of imaging apparatuses 100a and 100b as examples of the image processing apparatus according to the embodiment of the present invention.
Figure 9B:
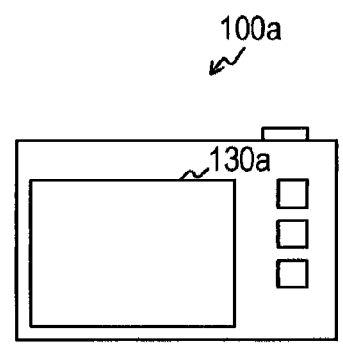

FIG. 9A is a front view of the imaging apparatus 100a. The imaging apparatus 100a captures an image of a subject through a lens unit 110a. The imaging apparatus 100a generates a still image upon press on a shutter unit 120a. FIG. 9B is a back view of the imaging apparatus 100a. A motion of the subject captured through the lens unit 110a is displayed on a display unit 130a. Also, the generated still image is displayed on the display unit 130a.

Figure 9C:
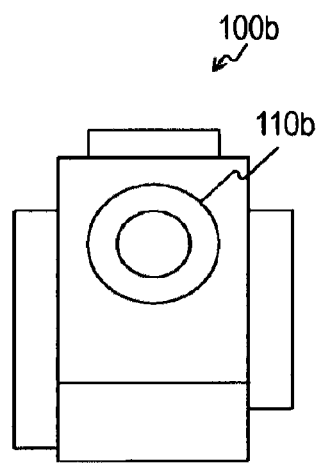
Figure 9D:
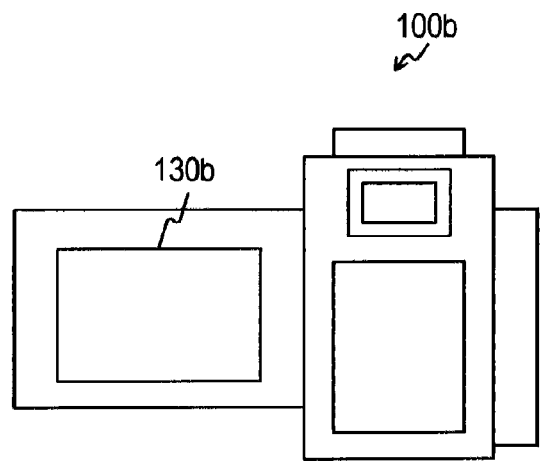

FIG. 9C is a front view of the imaging apparatus 100b. The imaging apparatus 100b captures an image of a subject through a lens unit 100b. The imaging apparatus 100b generates a moving image upon press on a record button (not shown). FIG. 9B is a back view of the imaging apparatus 100b. A motion of the subject captured through the lens unit 110b is displayed on a display unit 130b. Also, the generated moving image is displayed on the display unit 130b. Also, the imaging apparatus 100b has a function of generating a still image at the same time as generating a moving image, or generating a still image independently. The generated still image is also displayed on the display unit 130b.

Figure 10:
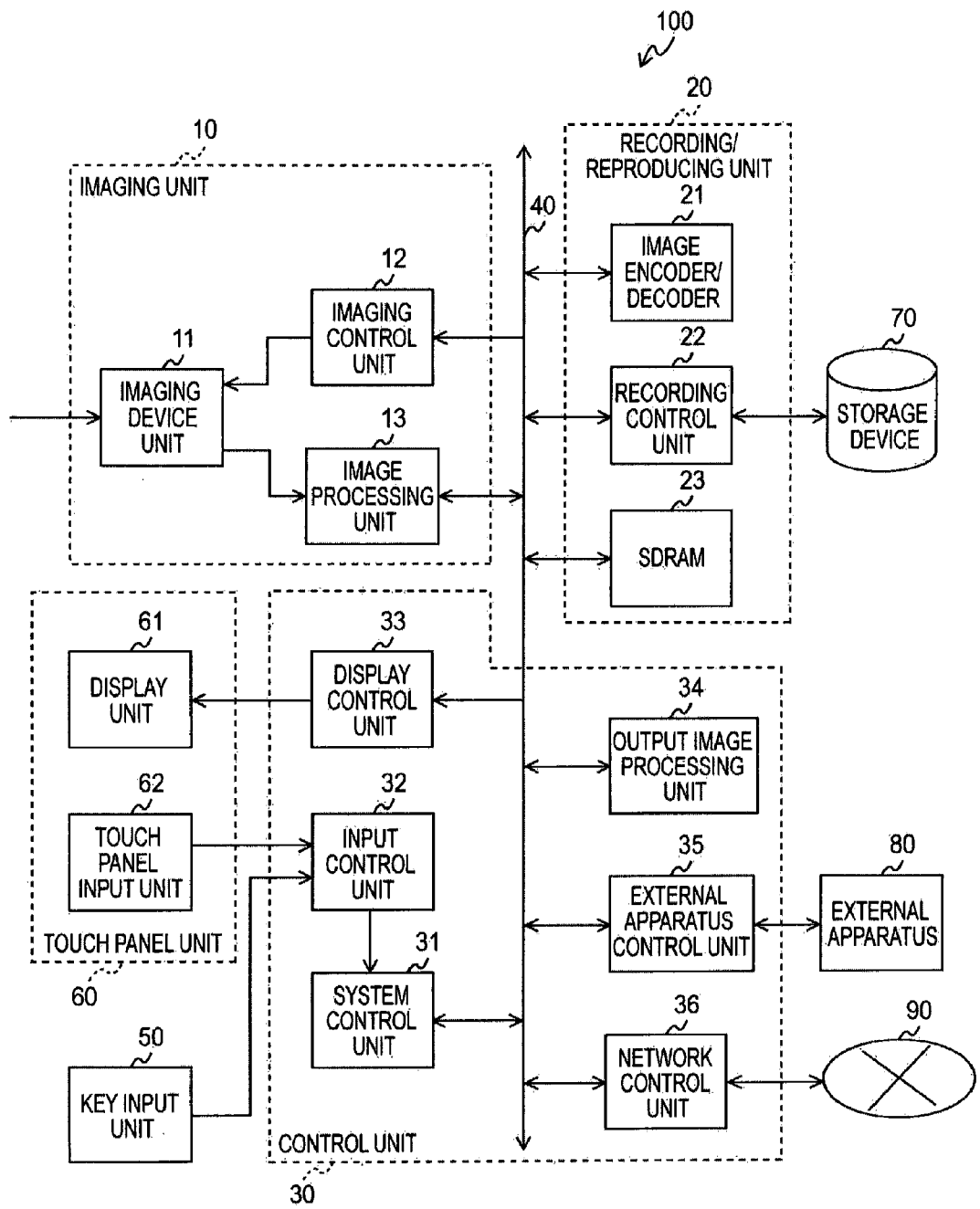
FIG. 10 shows a configuration of an imaging apparatus 100 as an example of the image processing apparatus according to the embodiment of the present invention.

FIG. 10 shows a configuration of an imaging apparatus 100 as an example of the image processing apparatus according to the embodiment of the present invention. The imaging apparatus 100 includes an imaging unit 10, a recording/reproducing unit 20, a control unit 30, a bus 40, a key input unit 50, a touch panel unit 60, and a storage device 70.

The imaging unit 10 includes an imaging device unit 11, an imaging control unit 12, and an image processing unit 13. The imaging device unit 11 includes a lens group for capturing an image of a subject (corresponding to the lens units 110a and 110b shown in FIGS. 9A and 9C), an aperture adjusting mechanism, a focus adjusting mechanism, and an imaging device such as a CCD (charge-coupled device). An image captured through the lens group is focused onto an imaging surface of the imaging device, such as a CCD. The imaging device unit 11 receives an image capturing timing signal supplied from the control unit 30 through the bus 40 in accordance with a shutter operation, converts the image of a subject focused onto the imaging surface of the imaging device to an imaging signal, and supplies the imaging signal to the image processing unit 13.

The imaging control unit 12 receives a control signal supplied from the control unit 30 through the bus 40 and generates a control signal to be supplied to the imaging device unit 11. Also, the imaging control unit 12 supplies the generated control signal to the imaging device unit 11 so as to perform zoom control, shutter control, and exposure control.

The image processing unit 13 performs gamma correction or AGC (auto gain control) on an imaging signal on the basis of a control signal supplied from the control unit 30 through the bus 40, and also converts the imaging signal to a digital image signal.

The recording/reproducing unit 20 includes an image encoder/decoder 21, a recording control unit 22, and an SDRAM (synchronous dynamic random access memory) 23. The image encoder/decoder 21 has an encoding function of encoding and multiplexing an image signal supplied from the imaging unit 10 through the bus 40 so as to convert the image signal to compressed data. Also, the image encoder/decoder 21 has a decoding function of decoding the compressed data to generate an image signal.

The recording control unit 22 receives compressed data from the image encoder/decoder 21 and writes the compressed data in the storage device 70. Also, the recording control unit 22 reads compressed data from the storage device 70 and supplies the compressed data to the image encoder/decoder 21. The storage device 70 may be attached to the imaging apparatus 100 or may be included in the imaging apparatus 100. Examples of the storage device 70 include a memory card, which is a flash memory packaged in a card, a magnetic disk such as a hard disk, an optical disk such as a DVD (digital versatile disk), and a magneto-optical (MO) disk, but other types of device may also be used. The SDRAM 23 is used as a work area for an encoding or decoding process performed by the image encoder/decoder 21.

The control unit 30 includes a system control unit 31, an input control unit 32, a display control unit 33, an output image processing unit 34, an external apparatus control unit 35, and a network control unit 36.

The system control unit 31 controls all processes of the control unit 30. The key input unit 50 connected to the input control unit 32 is provided with a plurality of keys, such as a mode switching key to switch between a shooting mode and another mode, e.g., a reproducing mode, a zoom adjusting key, an exposure adjusting key, a shutter key (corresponding to the shutter unit 120a shown in FIG. 9A), and a moving image taking key. The touch panel input unit 62 connected to the input control unit 32 accepts selection of a menu or specification of a predetermined area of image data displayed in the display unit 61.

The input control unit 32 transmits an operation signal from the key input unit 50 or the touch panel input unit 62 to the system control unit 31. The system control unit 31 determines which key has been operated in the key input unit 50 or the touch panel input unit 62, and performs control in accordance with the determination result.

The display unit 61 connected to the display control unit 33 includes an LCD (liquid crystal display) or the like, and displays an image signal supplied from the imaging unit 10 through the bus 40 and an image signal read from the storage device 70 under control by the system control unit 31. The display unit 61 corresponds to the display units 130a and 130b shown in FIGS. 9B and 9D.

The output image processing unit 34 performs a predetermined modifying process on image data during reproducing of the image data. The modifying process includes, for example, color correction of the image data. Alternatively, the process performed on the image data in the output image processing unit 34 may be performed in the system control unit 31.

An external apparatus 80 connected to the external apparatus control unit 35 may be a personal computer, but another apparatus may also be used. The external apparatus 80 may be connected to the external apparatus control unit 35 via a USB (universal serial bus) cable, but another connecting method may also be used. The external apparatus control unit 35 controls data communication between the imaging apparatus 100 and the external apparatus 80.

The network control unit 36 controls data communication between the imaging apparatus 100 and a network 90. The network includes the Internet or a LAN (local area network), but other types of network may also be used.

In this imaging apparatus 100, the display of time-series sections as shown in FIG. 3 is not always appropriate, considering a display area of the display unit 61. Hereinafter, a modification for displaying time-series sections in a simpler manner is described.

Figure 11:
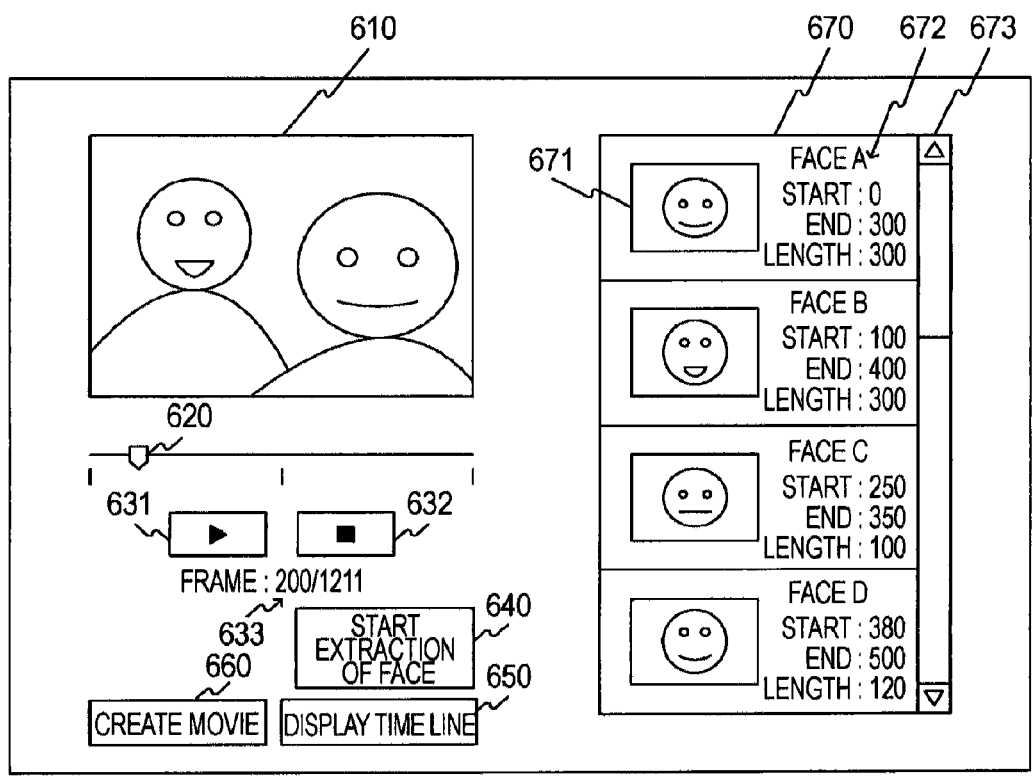
FIG. 11 shows a modification of display performed by the image processing apparatus according to the embodiment of the present invention.

FIG. 11 shows a modification of display in the image processing apparatus according to the embodiment of the present invention. In this display example, a time-series section display unit 670 is placed on the right side. In the time-series section display unit 670, a representative frame 671 of each person and information 672 about the person are displayed.

The information 672 includes a face label, a start time, an end time, and a time length. The representative frame 671, the face label, the start time, and the end time can be obtained from the representative frame 440, the face label 410, the start time 420, and the end time 430 in the face information table 400. The time length can be obtained on the basis of the difference between the end time and the start time.

Herein, a frame number is used as a unit of time. Alternatively, equivalent time may be displayed, and a GOP number may also be used.

A scroll bar 673 is displayed at the right edge of the time-series section display unit 670. By operating the scroll bar 673, a user can display a time-series section corresponding to a person outside the display area.

On the left side of the time-series section display unit 670, an image display unit 610 is placed on the upper side, and operation buttons are placed on the lower side. The operation buttons include a reproduced position bar 620, a reproducing button 631, a stop button 632, a reproducing time display 633, a face extraction starting button 640, a time line display button 650, and a movie creation button 660.

The reproduced position bar 620 indicates the position of a currently reproduced frame of image. A user can jump to a desired position by operating the reproduced position bar 620. The reproducing button 631 is used to reproduce and display an image. Upon press on the reproducing button 631 by the user, reproduced frames are displayed in the image display unit 610. The stop button 632 is used to stop reproducing and displaying operations. Upon press on the stop button 632 by the user, display in the display unit 610 stops.

The entire image may be reproduced by press on the reproducing button 631, but only frames corresponding to a section selected in the time-series section display unit 670 may be reproduced. Alternatively, a section in the time-series section display unit 670 may be reproduced immediately after being selected by a double click.

The reproducing time display 633 displays time corresponding to the frame currently reproduced in the image display unit 610. Herein, a frame number is used as a unit of time. Alternatively, equivalent time may be displayed, and a GOP number may also be used.

The face extraction starting button 640 is used to extract information corresponding to the time-series section display unit 670 from an original image. The time line display button 650 is used to display a two-dimensional time-series section described above with reference to FIG. 3. The movie creation button 660 is the same as the movie creation button 559 and is used to newly create an image including frames corresponding to the section selected in the time-series section display unit 670.

Now, an operation of the image processing apparatus according to the embodiment of the present invention is described with reference to the drawings.

Figure 12:
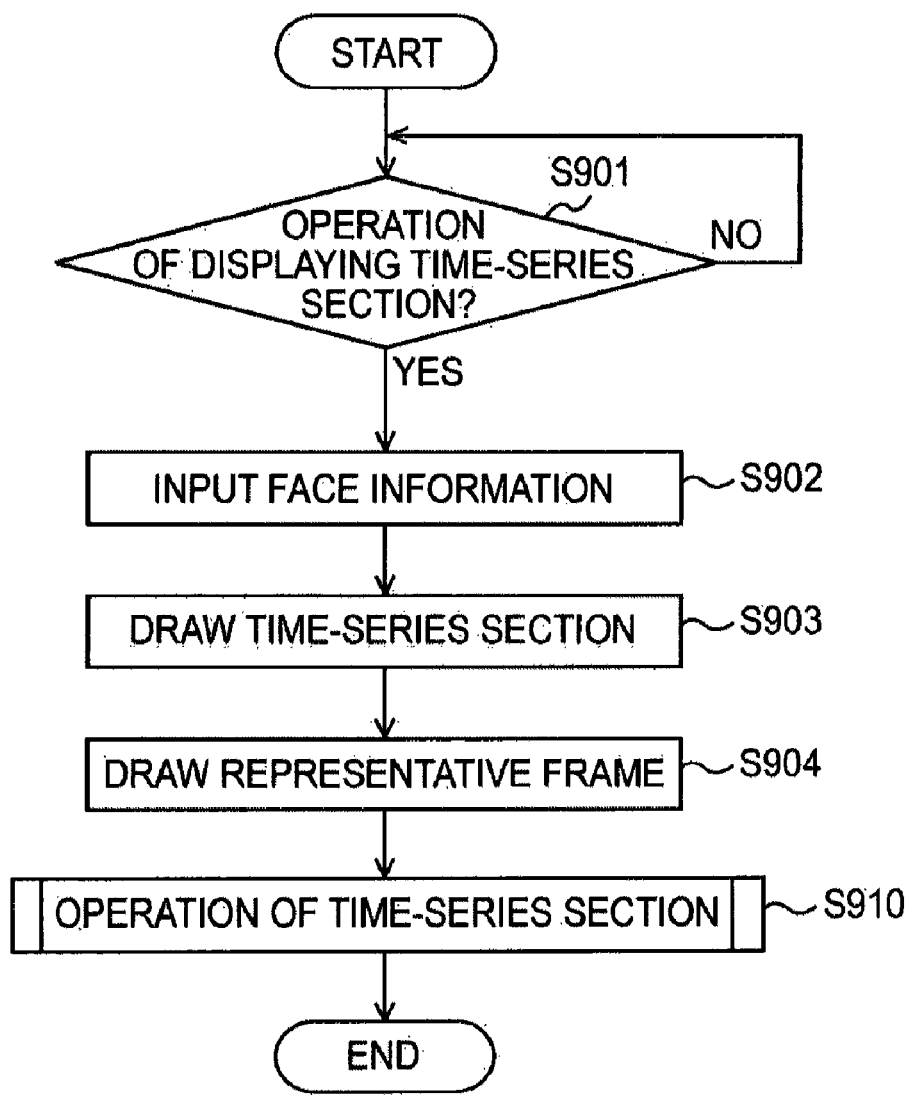
FIG. 12 shows an entire process performed by the image processing apparatus according to the embodiment of the present invention.

FIG. 12 shows an entire process performed in the image processing apparatus according to the embodiment of the present invention. First, an operation input requesting display of a time-series section is accepted by the input accepting unit 340 (step S901), and then face information is input from the face information generating unit 301 to the time-series section generating unit 320 (step S902).

The time-series section generating unit 320 draws a time-series section by using the time-series section bar 541 indicating a section of frames in a time-axis direction as shown in FIG. 3 and the information 672 of characters shown in FIG. 11 (step S903). Also, the time-series section generating unit 320 draws the representative frames 531 and 671 together with the time-series section (step S904). A result of the drawing is displayed in the display unit 305. Accordingly, the user can perform an operation input to the display of the time-series section (step S910).

Figure 13:
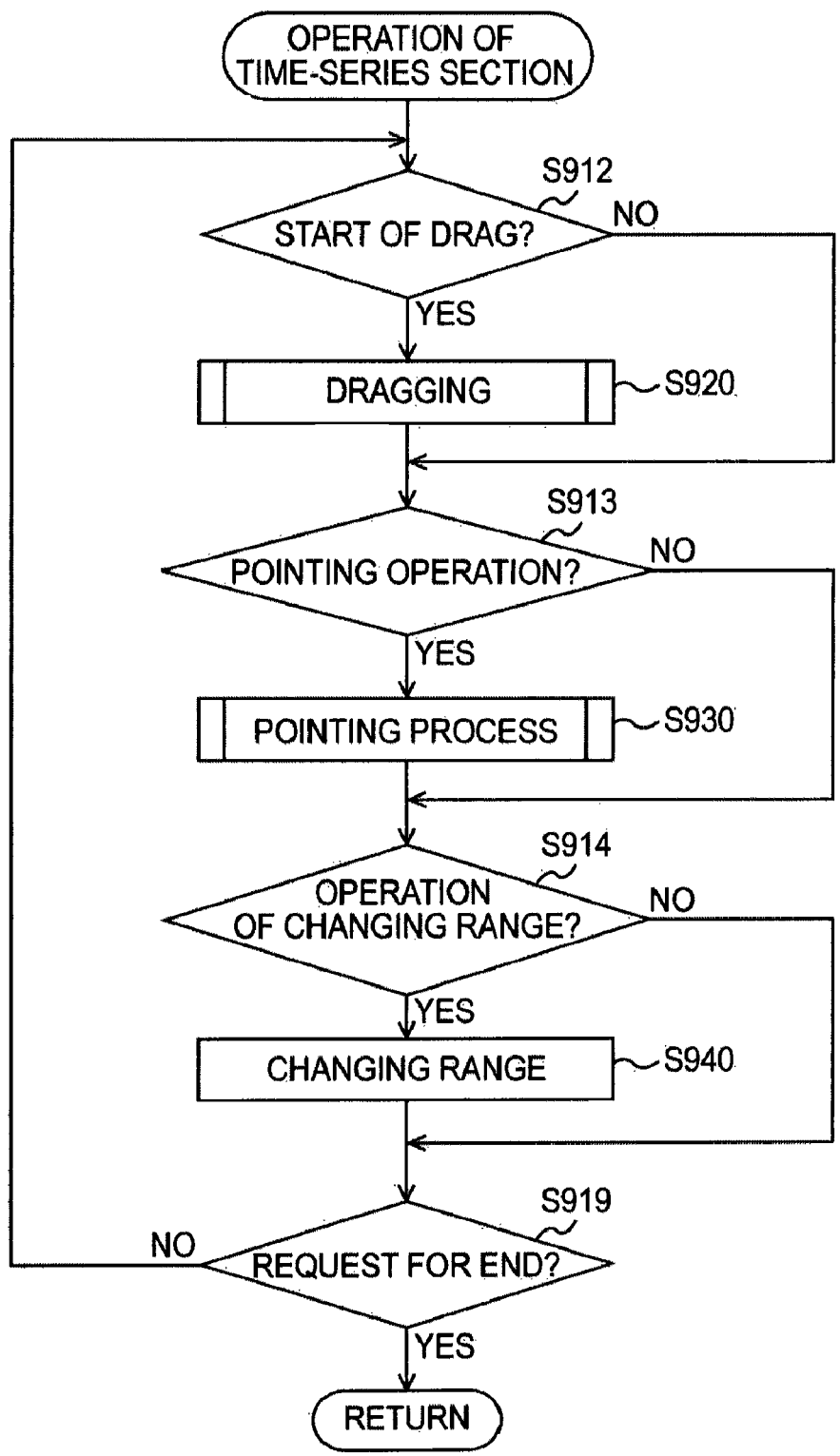
FIG. 13 shows a procedure of an operation of a time-series section performed by the image processing apparatus according to the embodiment of the present invention.

FIG. 13 shows a procedure of operating a time-series section in the image processing apparatus according to the embodiment of the present invention. The following description is made by applying the display example shown in FIG. 5. However, the same process can be performed in the modification shown in FIG. 11 in accordance with a procedure pursuant thereto.

The input accepting unit 340 waits for an operation input about a time-series section, and performs dragging (step S920) if a drag operation starts (step S912), performs pointing (step S930) if a pointing operation starts (step S913), and performs a range changing operation (step S940) if an operation of changing a range of the time-series section (see FIG. 7) is performed (step S914). These operations are repeated until an end request from the user is accepted by the input accepting unit 340 (step S919).

Figure 14:
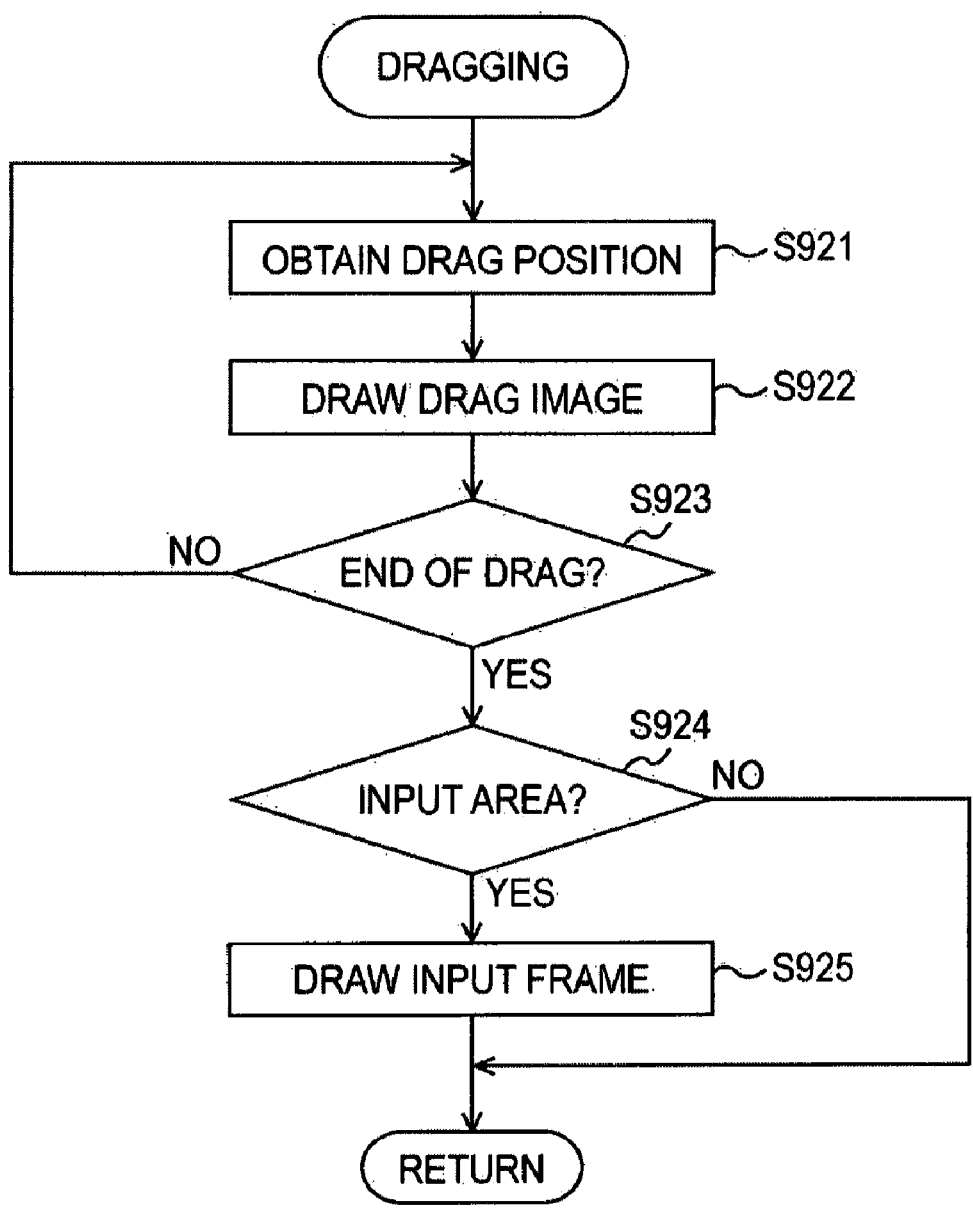
FIG. 14 shows a procedure of dragging performed by the image processing apparatus according to the embodiment of the present invention.

FIG. 14 shows a procedure of dragging (step S920) performed in the image processing apparatus according to the embodiment of the present invention. The dragging starts when the representative frame 531 or 532 is dragged by the mouse or the like.

During time when a drag operation is accepted by the input accepting unit 340, the image control unit 330 obtains the drag position (step S921) and draws a drag image (step S922). The drawn image is displayed in the display unit 305. This operation is repeated until the drag operation ends (step S923).

If the drag operation ends at a position in the edit input area 550 (step S924), the image control unit 330 draws the dragged representative frame in the edit input area 550 (step S925). The drawn frame is displayed in the display unit 305. Accordingly, the corresponding time-series section is registered to be edited.

Figure 15:
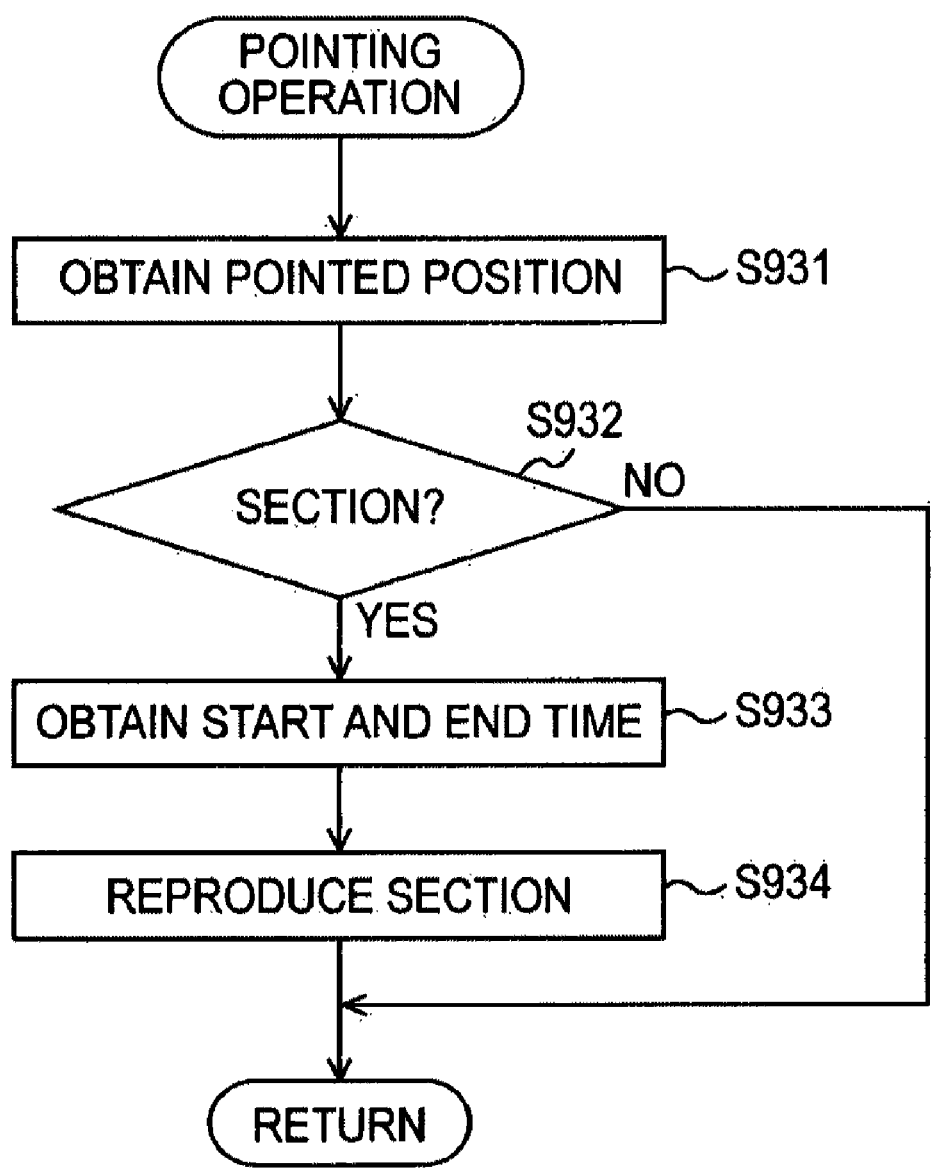
FIG. 15 shows a procedure of a pointing operation performed by the image processing apparatus according to the embodiment of the present invention.

FIG. 15 shows a procedure of a pointing operation (step S930) in the image processing apparatus according to the embodiment of the present invention. This pointing operation starts upon click on the mouse, for example.

After the input accepting unit 340 accepts a pointing operation, the image control unit 330 obtains the pointed position (step S931). If the pointed position is in the representative frame 531 or the time-series section bar 541 shown in FIG. 3 (step S932), the image control unit 330 obtains the start time and the end time of the time-series section on the basis of the face information supplied from the face information generating unit 301 (step S933). Then, the image control unit 330 reproduces frames of the section in the image file 200 corresponding to the obtained start time to end time (step S934). The reproduced frames are displayed in the display unit 305.

As described above, according to the embodiment of the present invention, the time-series section generating unit 320 draws a time-series section on the basis of face information supplied from the face information generating unit 301 and allows the display unit 305 to display the time-series section. Accordingly, a list of detected faces of people can be displayed so that the user can see all frames arranged in time series.

The above-described embodiment of the present invention is an example to embody the present invention, and has a correspondence with specific elements in the following claims. However, the present invention is not limited to the embodiment, but various modifications can be carried out without deviating from the scope of the present invention.

That is, input accepting means corresponds to the input accepting unit 340. Time-series section generating means corresponds to the time-series section generating unit 320. Image control means corresponds to the image control unit 330.

Accepting information specifying a time-series section where frames including a face of a specified person appear in an input image and information specifying a representative frame of the time-series section corresponds to step S902. Drawing the time-series section in a corresponding position on a time axis of the input image on the basis of the information specifying the time-series section corresponds to step S903. Obtaining the representative frame on the basis of the information specifying the representative frame and drawing the representative frame together with the time-series section corresponds to step S904.

The processing procedure described in the embodiment of the present invention may be regarded as a method including the series of steps, or a program allowing a computer to execute the series of steps and a recording medium storing the program.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus comprising:
input accepting means for accepting an operation input about an input image;
time-series section generating means for accepting information specifying a time-series section where frames including a face of a specified person appear in the input image and information specifying a representative frame of the time-series section and for drawing display of the time-series section to indicate start time and end time of the time-series section displayed in time relation to start time and end time of the input image as indicated by an indication of an entire length of the input image from the start time to the end time of the input image displayed with the display of the time-series section and the representative frame on the basis of the information; and
image control means for allowing the time-series section generating means to draw display of the time-series section to indicate the start time and the end time of the time-series section displayed in time relation to the start time and the end time of the input image as indicated by the indication of the entire length of the input image from the start time to the end time of the input image displayed with the display of the time-series section in accordance with the operation input.

2. The image processing apparatus according to claim 1, wherein the time-series section generating means further accepts information identifying the face of the person and draws the information together with display of the time-series section.

3. The image processing apparatus according to claim 1, wherein, if the input image includes faces of a plurality of people, the time-series section generating means draws display of the time-series section for each of the faces of the plurality of people.

4. The image processing apparatus according to claim 1, wherein, if a reproducing process of the time-series section is selected in the operation input, the image control means reproduces the input image corresponding to the selected time-series section.

5. The image processing apparatus according to claim 1, wherein, if a new creating process of the time-series section is selected in the operation input, the image control means creates a new image on the basis of the input image corresponding to the selected time-series section.

6. An image processing apparatus comprising:
input accepting means for accepting an operation input about an input image;
time-series section generating means for accepting information specifying a time-series section where frames including a face of a specified person appear in the input image and information specifying a representative frame of the time-series section and for drawing display of the time-series section to indicate start time and end time of the time-series section displayed in time relation to start time and end time of the input image as indicated by an indication of an entire length of the input image from the start time to the end time of the input image displayed in a time axis direction on a time axis with the display of the time-series section and the representative frame on the basis of the information; and
image control means for allowing the time-series section generating means to draw display of the time-series section to indicate the start time and the end time of the time-series section displayed in time relation to the start time and the end time of the input image as indicated by the indication of the entire length of the input image from the start time to the end time of the input image displayed in a time axis direction on the time axis with the display of the time-series section in accordance with the operation input.

7. The image processing apparatus according to claim 6, wherein, if the input image includes faces of a plurality of people, the time-series section generating means draws display of the time-series section of each of the people so that the faces of the plurality of people are placed in a direction vertical to the time axis direction.

8. An image display method comprising:
accepting information specifying a time-series section where frames including a face of a specified person appear in an input image and information specifying a representative frame of the time-series section;
drawing the time-series section to indicate start time and end time of the time-series section displayed in a corresponding position on a time axis of the input image indicated by an indication of an entire length of the input image from the start time to the end time of the input image displayed with the display of the time-series section on the basis of the information specifying the time-series section; and
obtaining the representative frame on the basis of the information specifying the representative frame and drawing the representative frame together with the time-series section drawn to indicate the start time and the end time of the time-series section displayed in the corresponding position on the time axis of the input image indicated by the indication of the entire length of the input image from the start time to the end time of the input image displayed with the display of the time-series section.

9. A program stored on a non-transitory computer readable medium allowing a computer to execute:
accepting information specifying a time-series section where frames including a face of a specified person appear in an input image and information specifying a representative frame of the time-series section;
drawing the time-series section to indicate start time and end time of the time-series section displayed in a corresponding position on a time axis of the input image indicated by an indication of an entire length of the input image from the start time to the end time of the input image displayed with the display of the time-series section on the basis of the information specifying the time-series section; and obtaining the representative frame on the basis of the information specifying the representative frame and drawing the representative frame together with the time-series section drawn to indicate the start time and the end time of the time-series section displayed in the corresponding position on the time axis of the input image indicated by the indication of the entire length of the input image from the start time to the end time of the input image displayed with the display of the time-series section.

10. An image processing apparatus comprising:

an input accepting unit configured to accept an operation input about an input image;

a time-series section generating unit configured to accept information specifying a time-series section where frames including a face of a specified person appear in the input image and information specifying a representative frame of the time-series section and to draw display of the time-series section to indicate start time and end time of the time-series section displayed in time relation to start time and end time of the input image as indicated by an indication of an entire length of the input image from the start time to the end time of the input image displayed with the display of the time-series section and the representative frame on the basis of the information; and an image control unit configured to allow the time-series section generating unit to draw display of the time-series section to indicate the start time and the end time of the time-series section displayed in time relation to the start time and the end time of the input image as indicated by the indication of the entire length of the input image from the start time to the end time of the input image displayed with the display of the time-series section in accordance with the operation input.

11. An image processing apparatus comprising:

an input accepting unit configured to accept an operation input about an input image;

a time-series section generating unit configured to accept information specifying a time-series section where frames including a face of a specified person appear in the input image and information specifying a representative frame of the time-series section and to draw display of the time-series section to indicate start time and end time of the time-series section displayed in time relation to start time and end time of the input image as indicated by an indication of an entire length of the input image from the start time to the end time of the input image displayed in a time axis direction on a time axis with the display of the time-series section and the representative frame on the basis of the information; and an image control unit configured to allow the time-series section generating unit to draw display of the time-series section to indicate the start time and the end time of the time-series section displayed in time relation to the start time and the end time of the input image as indicated by the indication of the entire length of the input image from the start time to the end time of the input image displayed in a time axis direction on the time axis with the display of the time-series section in accordance with the operation input.

* * * * *